United States Patent
Browne et al.

(10) Patent No.: US 8,350,490 B2
(45) Date of Patent: Jan. 8, 2013

(54) CROP LIGHTING

(75) Inventors: Randolph Antonio Marcus Browne, Lichtenvoorde (NL); Petrus Gerardus Maria Wolberink, Groenlo (NL); Antonius Marinus Telgenhof Oude Koehorst, Hengelo (NL)

(73) Assignee: N.V. Nederlandsche Apparatenfabriek "Nedap", Groenlo (NL)

( * ) Notice: Subject to any disclaimer, the term of this patent is extended or adjusted under 35 U.S.C. 154(b) by 677 days.

(21) Appl. No.: 12/085,467

(22) PCT Filed: Nov. 24, 2006

(86) PCT No.: PCT/NL2006/000548
§ 371 (c)(1),
(2), (4) Date: Oct. 1, 2009

(87) PCT Pub. No.: WO2007/061287
PCT Pub. Date: May 31, 2007

(65) Prior Publication Data
US 2010/0031562 A1 Feb. 11, 2010

(30) Foreign Application Priority Data
Nov. 24, 2005 (NL) ..................... 1030511

(51) Int. Cl.
*G05F 1/00* (2006.01)
(52) U.S. Cl. ..................... 315/291; 315/292
(58) Field of Classification Search ............. 315/156, 315/157, 158, 159, 224, 33, 34, 307, 308, 315/291, 312
See application file for complete search history.

(56) References Cited

U.S. PATENT DOCUMENTS

| 4,396,872 | A | 8/1983 | Nutter |
| 4,749,916 | A | 6/1988 | Yamazaki et al. |
| 5,818,734 | A * | 10/1998 | Albright ................. 700/306 |
| 6,400,103 | B1 * | 6/2002 | Adamson ................ 315/292 |
| 6,459,938 | B1 * | 10/2002 | Ito et al. ................... 700/9 |
| 6,554,439 | B1 * | 4/2003 | Teicher et al. ............. 362/2 |
| 7,234,270 | B2 * | 6/2007 | Brault et al. ............. 47/17 |
| 2003/0209999 | A1 * | 11/2003 | Hui et al. ................. 315/294 |
| 2004/0119423 | A1 * | 6/2004 | Yablonowski ............ 315/291 |
| 2005/0252078 | A1 | 11/2005 | Albright et al. |

FOREIGN PATENT DOCUMENTS

| DE | 298 01 058 | 5/1998 |
| JP | 2001-251959 | 9/2001 |

OTHER PUBLICATIONS

International Search Report dated Feb. 20, 2007.

\* cited by examiner

*Primary Examiner* — Minh D A
(74) *Attorney, Agent, or Firm* — Jacobson Holman PLLC

(57) ABSTRACT

A method and lighting installation for use in horticulture for lighting crops in a greenhouse, with a number of lamps ($2a \ldots 2n$) provided above the crops to be lighted, and a number of dimmer devices ($4a \ldots 4n$) for the lamps, wherein the dimmer devices ($4a \ldots 4n$) are provided with control means for periodically, automatically, varying the light intensity of the light sources cooperating with the dimmer devices according to a predetermined pattern.

18 Claims, 6 Drawing Sheets

CROP LIGHTING

This is a national stage of PCT/NL2006/000548 filed Nov. 24, 2006 and published in English.

The invention relates to a method and lighting installation, respectively, for use in greenhouse farming for lighting crops in a greenhouse, comprising a number of light sources, such as lamps, provided above the crops to be lighted, and a number of dimmer devices for the light sources. The invention further relates to a method for lighting crops.

Light is an important production factor in greenhouse farming. When there is insufficient sunlight for optimal growth or production, a lighting installation in the greenhouse can supplement the natural light. In countries such as, for instance, the Netherlands, during the winter months, due to low sunlight intensity and short days, many crops can only be grown cost-effectively with the aid of assimilation lighting.

In the early nineties, the first tests involving lighting crops artificially began, after which the first projects were installed. The respective installations comprise gas discharge lamps, and were equipped with electromagnetic ballasts, which are placed between the electric mains and the lamps to provide the proper operation of the lamps. These ballasts were simple, robust and limited in use. The specified power was dispensed to the lamp only with proper mains conditions, with high energy losses. These ballasts also need large condensers to compensate the higher harmonic mains currents.

Recently, applicant has designed an electronic ballast for assimilation lighting. This offers a number of advantages with respect to the electromagnetic variant:

Smaller volume and lower weight, so that installation proceeds more smoothly.

The electronic ballast apparatus can provide a constant power to the lamp over a wide range of the mains voltage, so that the light level in the greenhouse can be the same everywhere.

Much less mains harmonic "pollution", preventing overheating of the mains current cable. Also, expensive rejectors are superfluous.

An improved power consumption from the mains (power factor pf from 0.98 to 0.99, as compared to 0.84 to 0.92). The energy losses are considerably smaller.

The electronic ballast can be dimmed to 50% of the specified lamp power, without the light spectrum changing.

As regards the lamp, advantages can be obtained too:

Less rapid ageing of the lamps.

More growth light per Watt (higher system efficiency).

Various lamps with different operating voltages are allowed.

More and more greenhouse growers embark on the purchase of assimilation lighting. Currently, there is a clearly noticeable trend: more electronic systems than conventional systems are purchased. This is mainly due to the advantages mentioned. However, the initial purchase costs and the energy costs connected to the use of the installation are high.

Energy costs increasingly determine the cost price of greenhouse and horticultural produce. Therefore, there is a need for methods and/or apparatus with the aid of which the energy consumption in greenhouse farming can be reduced.

The invention aims to meet this need and to provide, generally, a reliable and efficient method and lighting installation, respectively, for greenhouse farming.

To this end, according to the invention, a lighting installation of the described type is characterized in that the dimmer devices are provided with control means for periodically, automatically varying the light intensity of the light sources cooperating with the dimmer devices according to a predetermined pattern.

It holds in particular, that the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent, or does, at least virtually, not vary. In particular, all patterns are the same, but only phase-shifted relative to each other.

A method for lighting crops in a greenhouse with the aid of a number of light sources provided above the crops is characterized in that the light intensity of the light sources is periodically varied according to a predetermined pattern between a high level, at which a photosynthesis process takes place in the crop, and a low level.

In the following, the invention will be further elucidated with reference to the appended drawing.

Figure 3A:
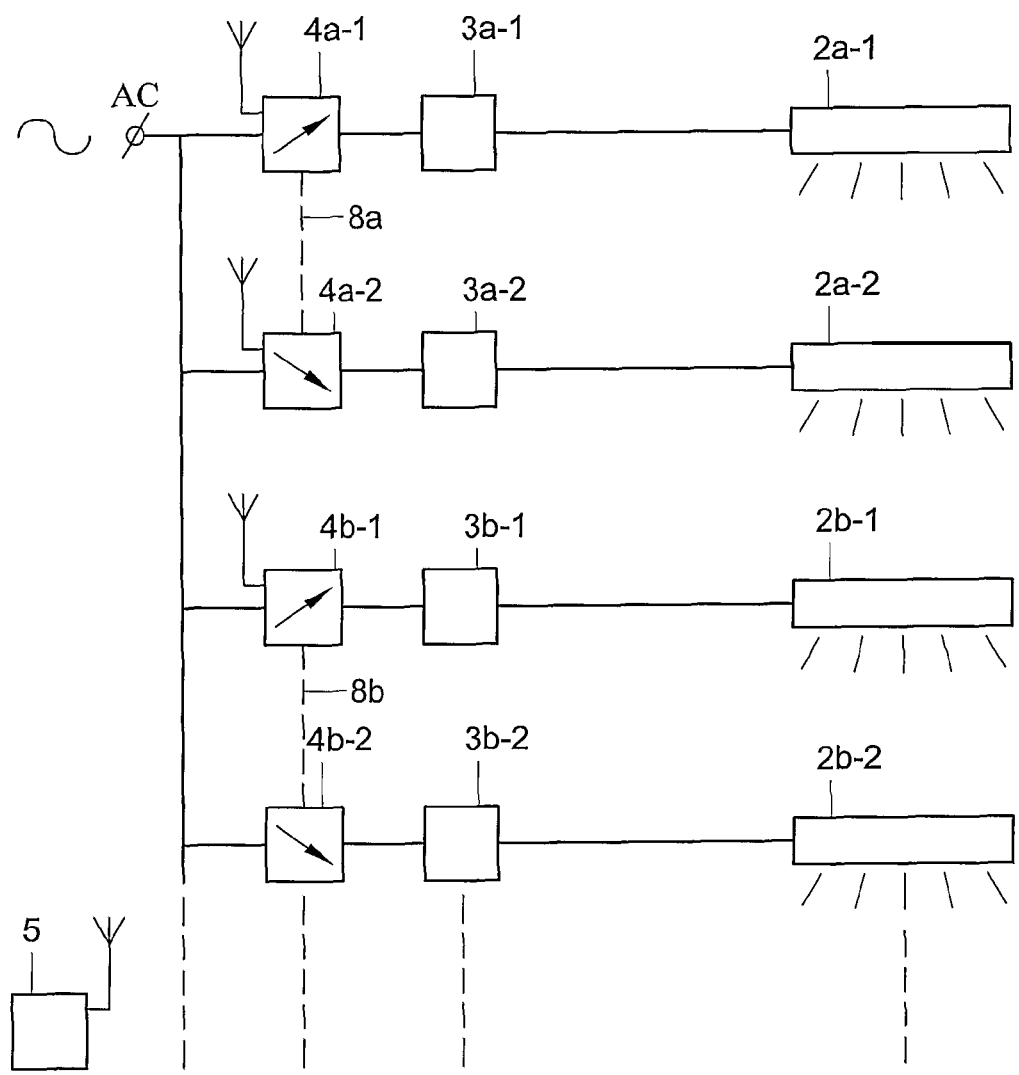
Figure 3B:
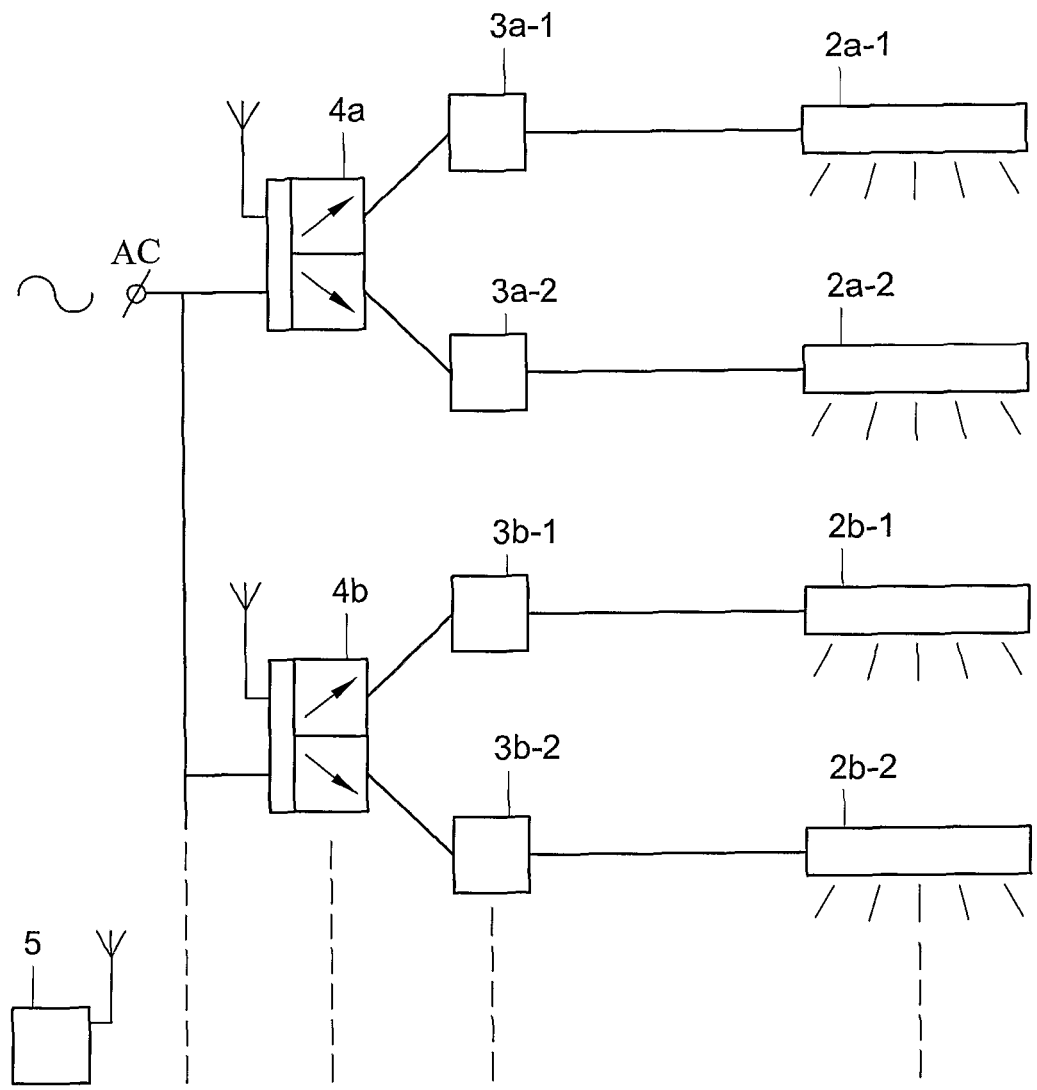
Figure 3C:
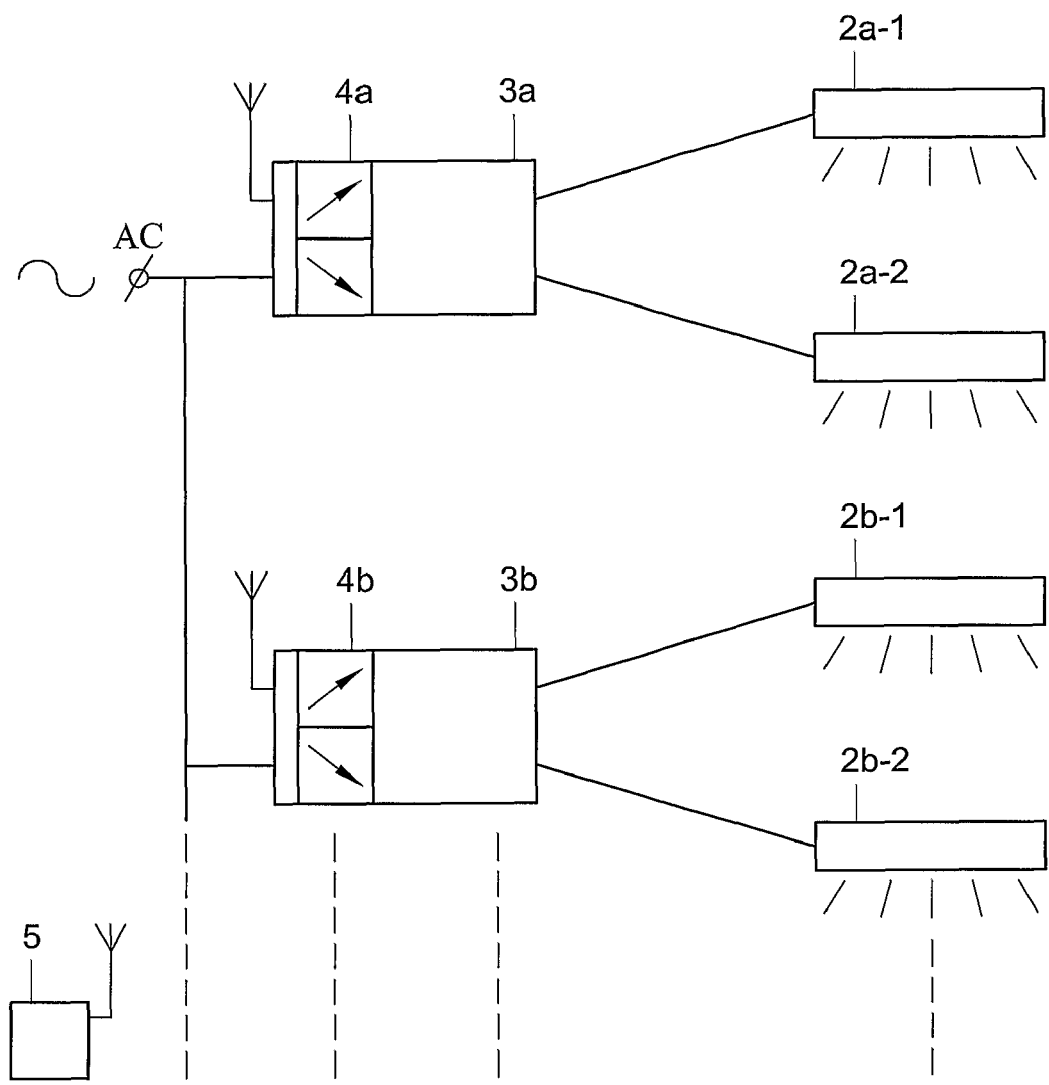
Figure 3D:
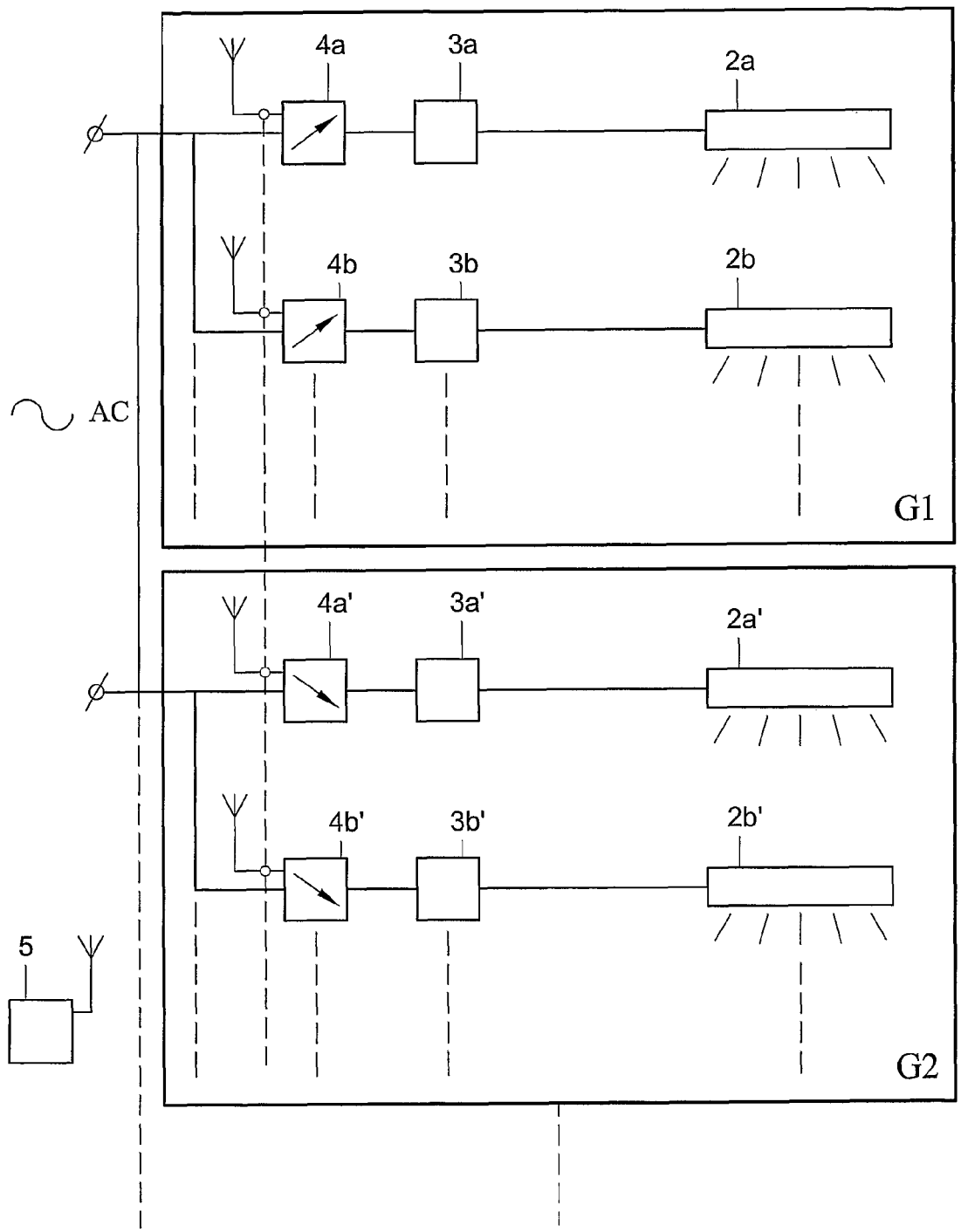
Figure 4:
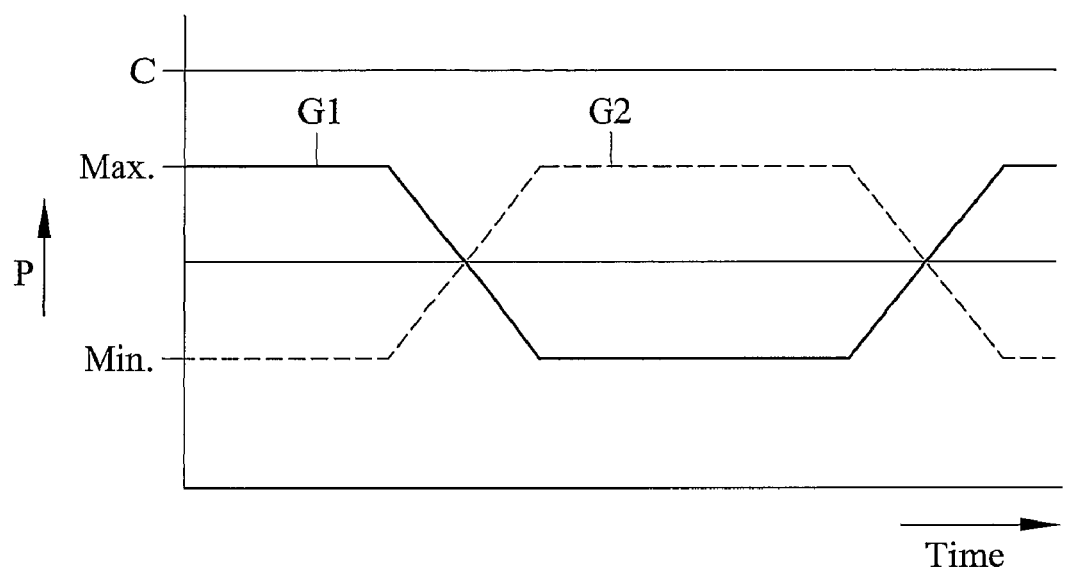

FIGS. 3a-d show block diagrams of alternative embodiments according to the invention; and FIG. 4 illustrates an alternative example of a lighting diagram according to the invention for use in a greenhouse.

Figure 1:
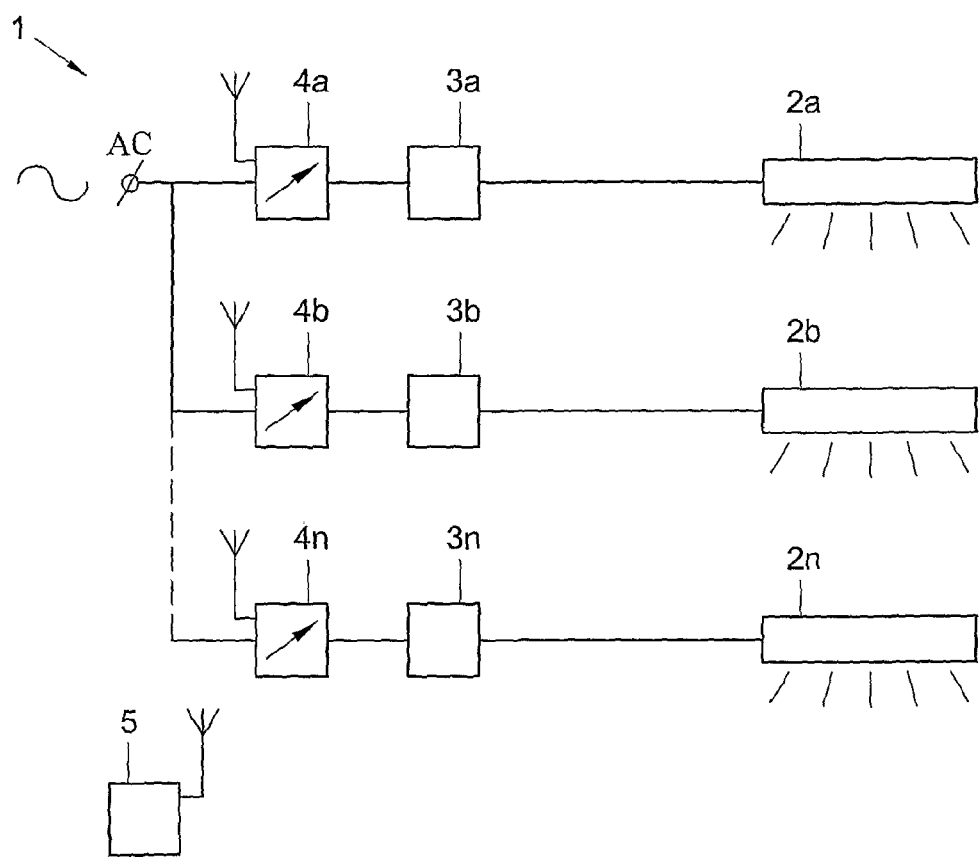
FIG. 1 shows a block diagram of an example of a lighting installation for a greenhouse according to the invention.

By way of example, FIG. 1 shows a block diagram of a possible lighting installation 1 according to the invention, which can be utilized in a greenhouse. The installation shown comprises a number of lamps $2a, 2b \ldots 2n$, which are excited by associated electronic ballasts $3a, 3b, \ldots 3n$. The installation is supplied from an alternating current network AC. The electronic ballasts $3a, 3b \ldots 3n$ are designed as dimmable ballasts. To this end, dimmer devices are provided, indicated with $4a, 4b, \ldots 4n$, which can control the ballasts in a manner such that lamps connected to the ballasts can be set at a desired light level. In FIG. 1, the dimmer devices are drawn separately but will, as a rule, be integrated in the ballasts. The desired level of light can be set, with a given mains voltage, between a maximum and minimum light level, determined by the lamps and/or the ballasts.

Research has shown that crops do not need continuous lighting for optimal growth. When, with a high lighting level, the photosynthesis process takes place in the crop, whereby the chloroplast of green leaf plants converts $CO_2$ into carbohydrates under the influence of light, this process then reaches a temporary condition of saturation, in which further intense lighting is no longer of use.

The invention utilizes the above-described phenomenon by reducing the lighting level of the crops in the greenhouse during the condition of saturation of the photosynthesis process.

To that end, in the installation shown in FIG. 1, dimmer devices $4a, 4b, \ldots 4n$ are of controllable design.

Figure 2:
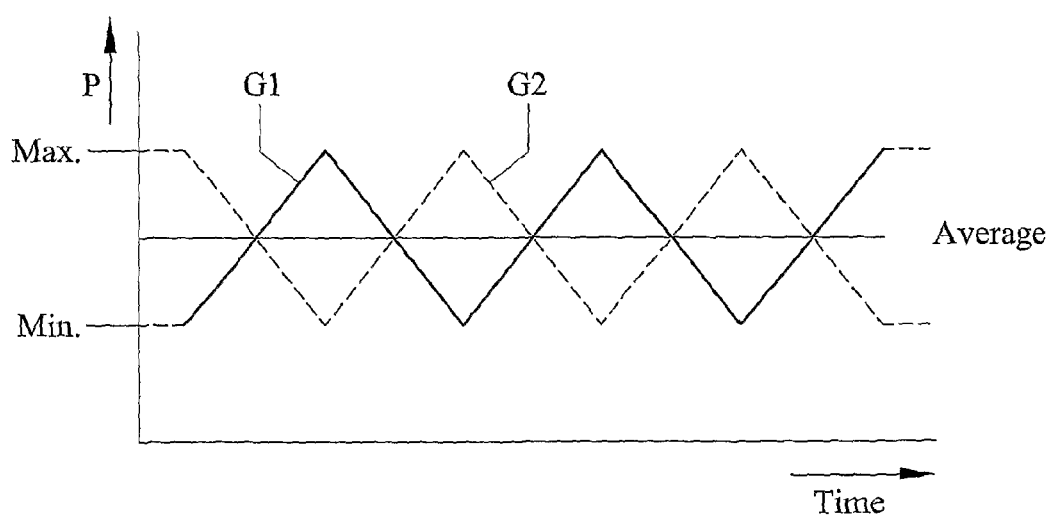
FIG. 2 illustrates an example of a lighting diagram according to the invention for use in a greenhouse.

In FIG. 2, in a highly schematic manner, a possible periodic variation of the crop lighting intensity is represented. The dimmer devices are correspondingly controlled according to a predetermined program, which corresponds to the desired variation of the crop lighting level.

FIG. 2 shows a lighting variation rising steadily, periodically, from a minimum level Min to a maximum level Max and then falling again from the maximum level to the minimum level etc. In FIG. 2 are represented two lighting patterns which are identical yet shifted a half period in time, for groups of lamps G1 and G2. In this manner, the total power P consumed by the electric lighting installation can be kept constant in spite of the periodic variation of the lighting intensity.

Naturally, it is also possible to utilize a different number of groups.

In this example, it holds that the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent or does, at least virtually, not vary. In particular, all patterns are the same, but only phase-shifted relative to each other. All this appears directly from FIG. 2. It also holds in this example that the installation is at least provided with a first group of light sources G1 and a second group of light sources G2, while the phase shift between the pattern of the first group and the pattern of the second group is at least virtually equal to a half period of the pattern.

In the schematic example of FIG. 2, the variation pattern of the lighting intensity is a triangular pattern. Many other patterns are conceivable, such as, for instance, a trapezoid pattern or a sine curve. In the latter case, for instance, when two groups of lamps are used, the total consumed electric power of the lighting installation is not constant, but the variation of the consumed electric power is smaller than in the case of a single group of lamps. According as more groups are used, the total consumed power approximates a constant value more closely. In horticulture, due to the nature of the total energy installations used, a constant, or not rapidly changing energy consumption is desired.

In FIG. 2, further, the relation between peaks and valleys of the variation patterns is equal to 1.

Also, the repetition frequency of the variation can be different. Tests have been carried out with a repetition frequency of 3 to 6 times a minute.

An optimally varying lighting pattern can be empirically determined for each crop.

The dimmer devices 4a, 4b, . . . 4n shown in FIG. 1 are represented as separate units but can also be integrated in the ballasts.

The dimmer devices can be wireless, as shown, or be controlled via wires from a central, pre-programmed control device 5. When utilizing several groups of lamps, also, several central control devices can be used, or one or more combined control devices that can control a number of groups. Also, a combination of wireless (main receiver) and wired (followers, operated from the main receiver) systems is possible.

Different groups of lamps can be located in different areas within a greenhouse, but can also be placed such that different groups of lamps light the same area. In that case, other values will result for the total minimum and maximum lighting intensity and repetition frequency in the respective area.

It is expected that, when using a method and/or installation according to the invention, a saving on the consumption of electric energy for crop lighting in a greenhouse of at least 15% can be achieved.

FIG. 3a shows, by way of example, an alternative block diagram of a possible lighting installation 1 according to the invention, which can be utilized in a greenhouse. The installation shown comprises a number of lamps 2a-1, 2a-2, 2b-1, 2b-2, etc, which are excited per pair (2a-1, 2a-2; 2b-1, 2b-2 etc) by associated electronic ballasts 3a-1, 3a-2, 3b-a, 3b-2, etc. The installation is fed from an alternating current network AC. The electronic ballasts 3a-1, 3a-2, etc are designed as dimmable ballasts. To this end, coupled dimmer devices are provided, indicated with 4a-1, 4a-2, 4b-1, 4b-2, etc, which can control the ballasts in such a manner that the lamps connected to the ballasts can be set at a desired light level. In FIG. 3a, the dimmer devices are drawn separately but can be integrated, also mutually, in one dimmer device, see FIG. 3b. The dimmer devices and ballasts can also be integrated in one apparatus, see FIG. 3c. With a given mains voltage, the desired light level can be set between or at a particular maximum light level or a minimum light level determined by the lamps and/or the ballasts.

The dimmer devices 4a-1, 4b-i, (i=1, 2, . . . ) etc are of controllable design.

In FIG. 4, in a highly schematic manner, a possible periodic variation of the crop lighting intensity is represented. The dimmer devices are correspondingly controlled according to a predetermined program which corresponds to the desired variation of the crop lighting level.

FIG. 4 shows a lighting variation rising steadily, periodically from a minimum level Min to a maximum level Max, to light at the Max level for a presettable fixed period, and then falling again from the maximum level to the minimum level, to light at the Min level for the same period, and so on. FIG. 4 shows two lighting patterns of the dimmer devices coupled in pairs, which are identical but shifted a half period in time, for groups of ballasts coupled thereto mutually or not mutually, provided with groups of lamps G1 and G2. In this manner, the total electric power consumed by the lighting installation from the AC network mentioned in FIGS. 3a-3c can be kept constant in spite of the periodic variation of the lighting intensity.

Here, a first group G1 of lamps consists of, for instance, lamps 2a-1, 2b-1, 2c-1, etc. A second group G2 of lamps can then consist of, for instance, lamps 2a-2, 2b-2, 2c-1, etc. The power consumed by the first group G1 and the second group G2 is shown in FIG. 4.

In the schematic example of FIG. 4, for the variation pattern of the lighting intensity, a square wave pattern is chosen. Both the maximum and the minimum level, the gradients, but also the repetition frequency of the signals depend on the properties of the low pressure sodium lamps frequently used in horticulture. Irrespective of the number of groups used, the total consumed power will have a constant value C. In horticulture, due to the nature of the total energy installations used, a constant, or not rapidly changing energy consumption is desired.

In this example, the coupling 8a between the dimmer devices 4a-1 and 4a-2 causes the control of this dimmer device to be shifted a half period relative to each other. The coupling 8b between the dimmer devices 4b-1 and 4b-2 causes the control of this dimmer device to be shifted a half period relative to each other. A similar thing applies to the remaining lamps. With the control 5, for instance, the dimmer devices 4a-1, 4b-1 etc are controlled in the same manner. Then, the dimmer devices 4a-2, 4b-2 follow this control via the couplings 8a, 8b, etc, albeit phase-shifted a half period relative to the control of the control 5. These couplings can also be present in the installations according to FIGS. 3b and 3c. The operation is then completely analogous to what has been described for FIG. 3a.

Other divisions in groups are possible too. A first group G1 can for instance comprise the single lamp 2a-1, and a second group G2 the single lamp 2a-2. In this example, the coupling 8a between the dimmer devices 4a-1 and 4a-2 causes the control of this dimmer device to be shifted a half period relative to each other. The coupling 8b between the dimmer devices 4b-1 and 4b-2 causes the control of this dimmer device to be shifted a half period relative to each other. A third group G3 can for instance comprise the single lamp 2b-1, and a fourth group G4 can comprise the single lamp 2b-2. Something similar applies to the remaining lamps.

Naturally, a first group G1 can also comprise lamps 2a, 2b, etc as shown in FIG. 3d. Then, a second group can comprise lamps 2a', 2b', etc. The power variation of the group G1 and G2 can once again be such as shown in FIG. 4. Completely analogously, the system can further be provided with a third group G3 and a fourth group G4, while the sum of the consumed powers of the groups G3 and G4 is, again, virtually constant as described hereinabove for the groups G1 and G2. Here, the groups G1, G2 on the one side, and the groups G3, G4 on the other side can be controlled completely independently of each other.

It is noted that after the foregoing, many variations are obvious to the skilled person. It is, for instance, conceivable that the dimmer devices for one or more lamps, or groups of lamps are designed to be self-programmable, so that separate control devices are not necessary. The invention is further applicable to any type of light source that can be dimmed via or without a ballast. However, the invention is mainly directed to the low pressure sodium lamps with powers varying between and including 400 W and 1,000 W frequently used in horticulture. But the invention can also be utilized with other types of lamps.

Further, programming the dimmer devices can be done via software, or, if desired, mechanically, via for instance, a cam disc or the like.

The invention claimed is:

1. A lighting installation for use in greenhouse farming for lighting crops in a greenhouse, comprising a number of light sources, provided above the crops to be lighted, and a number of dimmer devices for the light sources, whereby the dimmer devices are provided with control means for periodically, automatically varying the light intensity of the light sources cooperating with the dimmer devices according to a predetermined pattern, wherein the light sources are divided into a number of groups, characterized in that the lighting installation being designed such that, in use, power of each group varies according to a predetermined pattern, while patterns of different groups are phase-shifted to each other such that the electric power consumed by joint groups varies less than the power variation of a single group, or such that the electric power consumed by the joint groups varies to a smallest possible extent, or does, at least virtually, not vary; the installation is at least provided with a first group of light sources and a second group of light sources, while the phase shift between the pattern of the first group and the pattern of the second group is at least virtually equal to a half period of the pattern.

2. The lighting installation according to claim 1, characterized in that the light sources are of a type that is excited by means of an electronic ballast, and that the ballasts are dimmable ballasts.

3. The lighting installation according to claim 1, characterized in that the dimmer devices are designed as programmable dimmer devices which can be programmed to vary the light intensity of the light sources cooperating with the dimmer devices according to a desired pattern.

4. The lighting installation according to claim 1, characterized by at least one central, programmable control device, which, in operation, controls a number of dimmer devices.

5. The lighting installation according to claim 4, characterized in that at least a part of the dimmer devices is designed, by means of a receiver, as wireless controllable device and that the central control device is designed for wirelessly controlling these dimmer devices.

6. The lighting installation according to claim 5, characterized in that at least one of the receivers is coupled by means of wiring to several dimmer devices operating as followers.

7. The lighting installation according to claim 1, characterized in that the light sources are divided into a number of groups, wherein the dimmer devices belonging to the different, separate groups are controlled according to corresponding, but phase-shifted patterns such that the amount of electric energy consumed by the joint groups varies to a smallest possible extent.

8. The lighting installation according to claim 1, characterized in that the control device is designed for periodically varying the light intensity of the light sources according to a predetermined pattern, between a high level, at which photosynthesis takes place in the crop, and a low level.

9. The lighting installation according to claim 8, characterized in that the low level is unequal to zero.

10. The lighting installation according to claim 1, characterized in that the light sources each have a power varying from 300 W to 2000 W, more particularly varying from 400 W to 1000 W.

11. The lighting installation according to claim 1, characterized in that the light sources are lamps, more particularly sodium lamps.

12. The method according to claim 11, characterized in that the light sources are lamps, more particularly sodium lamps.

13. A method for lighting crops in a greenhouse with the aid of a number of light sources provided above the crops, wherein the light intensity of the light sources is periodically varied according to a predetermined pattern between a high level, at which photosynthesis takes place in the crop, and a low level wherein the light sources are divided into a number of groups, characterized in that the lighting installation being designed such that in use, power of each group varies according to a predetermined pattern, while patterns of different groups are phase-shifted to each other such that the electric power consumed by joint groups varies less than the power variation of a single group, or such that the electric power consumed by the joint groups varies to a smallest possible extent, or does, at least virtually, not vary; the installation is at least provided with a first group of light sources and a second group of light sources, while the phase shift between the pattern of the first group and the pattern of the second group is at least virtually equal to a half period of the pattern.

14. The method according to claim 13, characterized in that the low level is greater than zero.

15. The method according to claim 13, characterized in that use is made of controllable, dimmable ballasts for the light sources.

16. The method according to claim 13, characterized in that the light sources are divided into light source groups and that the light intensity of the different light source groups is varied such that the electric energy consumed by the joint light sources groups varies as little as possible.

17. The method according to claim 13, characterized in that the light sources are divided into at least a first group of light sources and at least a second group of light sources, while the pattern of the first group and the pattern of the second group are shifted to each other a half period of the patterns.

18. The method according to claim 13, characterized in that the light sources each have a power varying from 300 W to 2000 W, more particularly varying from 400 W to 1000 W.

* * * * *

UNITED STATES PATENT AND TRADEMARK OFFICE
CERTIFICATE OF CORRECTION

PATENT NO. : 8,350,490 B2  
APPLICATION NO. : 12/085467  
DATED : January 8, 2013  
INVENTOR(S) : Browne et al.

Page 1 of 1

It is certified that error appears in the above-identified patent and that said Letters Patent is hereby corrected as shown below:

On the title page, item (75) lines 5-6: "Petrus Gerardus Maria Wolberink, Groenlo (NL);" should be
-- Petrus Gerhardus Maria Wolberink, Groenlo (NL); --

Signed and Sealed this
Twenty-second Day of October, 2013

Teresa Stanek Rea
*Deputy Director of the United States Patent and Trademark Office*